United States Patent
Amon et al.

(10) Patent No.: US 8,270,470 B2
(45) Date of Patent: Sep. 18, 2012

(54) TRANSCODING METHOD AND DEVICE

(75) Inventors: Peter Amon, München (DE); Jürgen Pandel, Feldkirchen-Westerham (DE)

(73) Assignee: Siemens Aktiengesellschaft, Munich (DE)

( * ) Notice: Subject to any disclaimer, the term of this patent is extended or adjusted under 35 U.S.C. 154(b) by 1486 days.

(21) Appl. No.: 11/791,351

(22) PCT Filed: Nov. 9, 2005

(86) PCT No.: PCT/EP2005/055846
§ 371 (c)(1),
(2), (4) Date: May 23, 2007

(87) PCT Pub. No.: WO2006/056531
PCT Pub. Date: Jun. 1, 2006

(65) Prior Publication Data
US 2008/0025391 A1    Jan. 31, 2008

(30) Foreign Application Priority Data
Nov. 23, 2004  (DE) .......................... 10 2004 056 446

(51) Int. Cl.
*H04N 7/24* (2011.01)

(52) U.S. Cl. .............................. 375/240.02; 375/240.18

(58) Field of Classification Search ............. 375/240.18, 375/240.19, 240.2
See application file for complete search history.

(56) References Cited

U.S. PATENT DOCUMENTS

| 5,737,019 | A | 4/1998 | Kim | |
|---|---|---|---|---|
| 6,285,716 | B1 | 9/2001 | Knee et al. | |
| 6,895,052 | B2 | 5/2005 | Hanamura et al. | |
| 7,630,439 | B2 * | 12/2009 | Kato et al. ............... | 375/240.18 |
| 2001/0031009 | A1 | 10/2001 | Knee et al. | |
| 2002/0054638 | A1 | 5/2002 | Hanamura et al. | |
| 2003/0202579 | A1 | 10/2003 | Lin et al. | |

(Continued)

FOREIGN PATENT DOCUMENTS

DE    101 46 220.4    9/2001

(Continued)

OTHER PUBLICATIONS

Kodama et al.; "Scalable Video Transcoding Method with Spatial Updatable Scalability"; The 47th Midwest Symposium on Circuits and Systems; Jul. 2004; vol. 1, pp. 257-260.

(Continued)

*Primary Examiner* — Gilberto Barron, Jr.
*Assistant Examiner* — Malcolm Cribbs
(74) *Attorney, Agent, or Firm* — Staas & Halsey LLP

(57) ABSTRACT

An encoded, digital video input signal having a base signal and at least one differential extension signal is transcoded by determining a first piece of page data and a first piece of transform coefficient data from the base signal; determining one respective second piece of page data and one respective piece of transform coefficient data from the base signal; and determining one respective second piece of page data and one respective piece of transform coefficient data from at least one differential extension signal. A third piece of page data is generated from the first and at least one second piece of page data, and a third piece of transform coefficient data is generated from the first and at least one second piece of transform coefficient data using a weighted addition. An encoded, digital video output signal is generated from the third pieces of page data and transform coefficient data.

21 Claims, 3 Drawing Sheets

U.S. PATENT DOCUMENTS

2006/0171463 A1* 8/2006 Hanamura et al. ....... 375/240.13

FOREIGN PATENT DOCUMENTS

| DE | 102 19 640 A1 | 4/2003 |
|---|---|---|
| DE | 102 00 901 A1 | 5/2003 |
| DE | 697 28 801 T2 | 4/2005 |
| EP | 0 845 908 A2 | 6/1998 |
| JP | 10-503895 | 4/1998 |
| JP | 2002-135130 | 5/2002 |
| WO | 95/35628 | 12/1995 |
| WO | 03/103295 A1 | 12/2003 |

OTHER PUBLICATIONS

J. Macnicol, et al.; "Scalable Video Coding by Stream Morphing"; Proceedings of 2002 International Conference on Image Processing, Sep. 2002; vol. 3, pp. 733-736.

H. Radha, "TranScaling: A Video Coding and Multicasting Framework for Wireless IP Multimedia Services"; Proceedings of the 4th ACM Interna-tional Workshop on Wireless Mobile Multimedia; Jul. 2001, pp. 13-20.

International Search Report for PCT/EP2005/058846; mailed Mar. 9, 2006.

German translation of Japanese Office Action issued May 26, 2010 in corresponding Japanese Patent Application 2007-541921.

JP 2002-135130 A corresponds to US 6,895,052 and US 2002/0054638 A1.

German Patent Publication No. 697 28 801 T2 corresponds to United States Patent No. 5,737,019.

JP 10-503895 was cited in a Japanese Office Action issued May 26, 2010 in corresponding Japanese Patent Application 2007-541921. A German translation of the Japanese Office Action is attached.

JP 10-503895 corresponds to US 6,285,716 and US 2001/0031009 A1.

* cited by examiner

EG(TV)

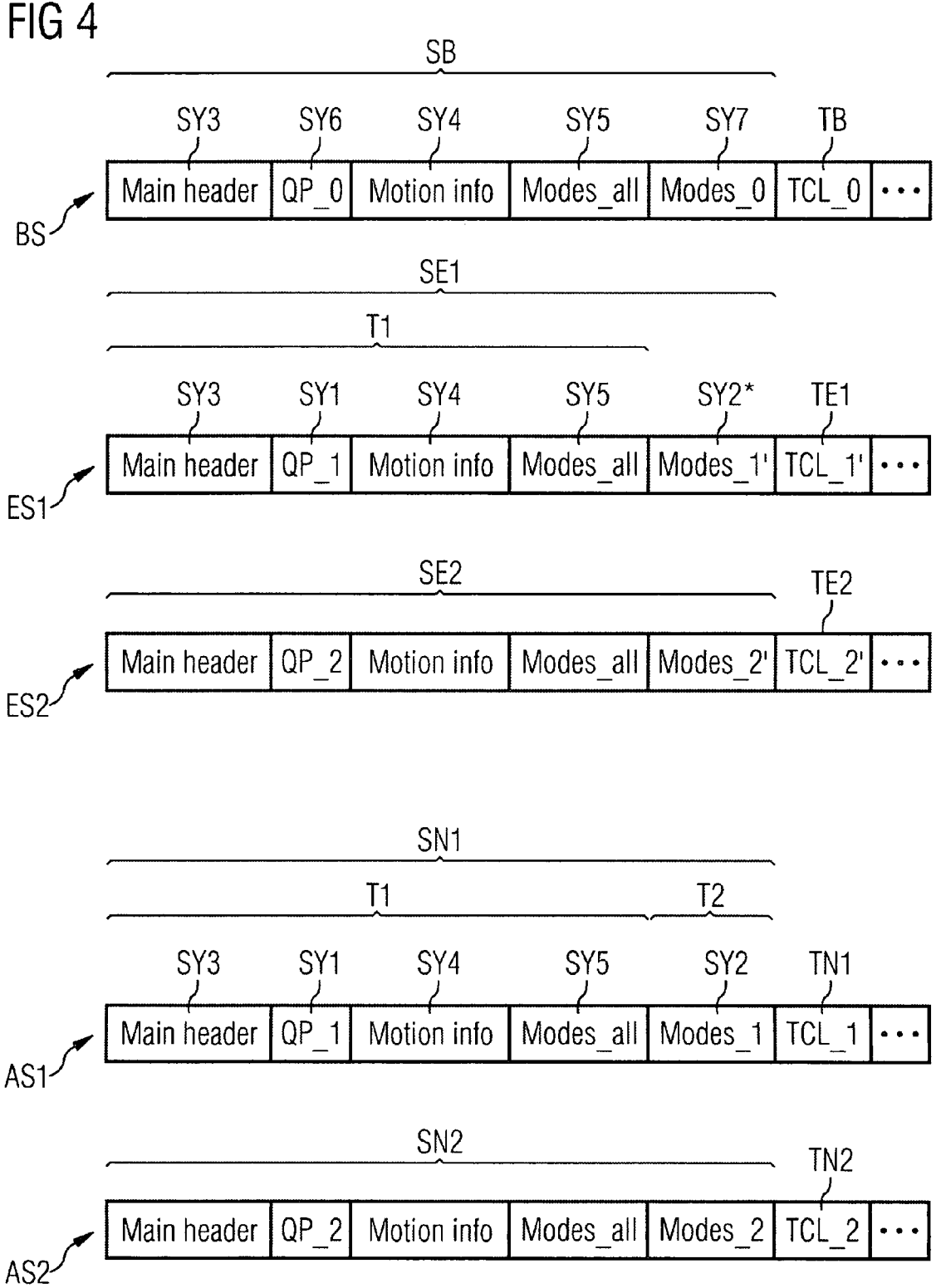

TRANSCODING METHOD AND DEVICE

CROSS REFERENCE TO RELATED APPLICATIONS

This application is based on and hereby claims priority to German Application No. 10 2004 056 446.9 filed on Nov. 23, 2004, the contents of which are hereby incorporated by reference.

BACKGROUND

Described below are a transcoding method and a transcoding device.

In many applications video signals are provided at a number of quality levels. Examples of this are:
- Digital TV at a number of quality levels for receivers (home TV devices, PCs, organizers, multimedia-enabled mobile terminals),
- Individual video services for different terminals and access points (broadband cable, XDSL, ISDN, UMTS)
- Pay TV and other video services, with video signals of better or worse quality being provided depending on the selected charge category.

Concepts have been presented for such systems in which the individual video signals are not encoded independently of each other (simulcast), but video signals of higher quality levels are derived from video signals of lower quality levels (differential encoding). See K. Illgner, J. Pandel, "Effiziente Codierung von Videosignalen für skalierbare Multicast-Speicherung und —Übertragung sowie zugehöriger Codec" (efficient encoding of video signals for scalable multicast storage and transmission as well as associated codec), publication DE 102 00 901 A1, and P. Amon, G. Bäse, J. Pandel, "Prädiktion von Videosignalpegeln für skalierbare Simulcast-Speicherung und —Übertragung" (prediction of video signal levels for scalable simulcast storage and transmission), file reference of German patent application DE 101 46 220.4. One of the ways in which efficient differential encoding is made possible is the synchronization of the encoding units during the encoding for the different quality levels. Such a method is known from P. Amon, K. Illgner, J. Pandel, "Verfahren zum Codieren und Decodieren von Videosequenzen und Computerprogrammprodukt" (method for encoding and decoding of video sequences and computer program product), Publication DE 102 19 640 A1. Synchronization in this context means that decisions are made only once relating to the encoding of an image or of part of an image in the various encoding units of the individual quality levels.

On the receiver side a plurality of encoded image data of the different quality levels is combined in the decoder and the video signal associated with the respective quality levels is reconstructed. A possible implementation of this type of decoder is known from citations in the Background section.

For a few applications it is however desirable for only a video signal at a specific level of quality to be provided. For example it is only possible for a mobile radio terminal to decode just one video signal for reasons of complexity. In a further scenario only the video signal with the lowest quality level is to be decoded and displayed in a PC. In this case it can be necessary in practice only to transit that video signal which corresponds to the lowest quality level.

SUMMARY

An aspect is to specify a method for transcoding as well as a transcoding device which makes possible simple and efficient transcoding of an encoded digital video input signal with a base signal and at least one differential extension signal.

In the method for transcoding an encoded digital video input signal with a base signal and at least one differential extension signal, a first piece of page data and a first piece of transformation coefficient data are determined from the base signal and a second piece of page data and a second piece of transformation coefficient data are determined from the at least one differential extension signal respectively, a third piece of page data is generated from the first and at least one second piece of page data, a third piece of transformation coefficient data is generated by weighted addition from the first and at least one second piece of transform coefficient data, with the first, second and third piece of transform coefficient data being based on an identical transform coefficient encoding method, and create an encoded digital video output signal from the third piece of page data and the third piece of transform coefficient data.

The method makes it possible to create an encoded digital video output signal from an encoded digital video input signal formed of at least one base signal and at least one differential extension signal. Furthermore, the result of dividing the base signal and of the differential extension signals into the relevant transform coefficient data and page data is to enable the encoded digital video output signal to be created in a simple manner.

The result of using the identical transform coefficient coding method for encoding the transform coefficient data is that the transformation coefficient data does not have to be decoded and subsequently encoded again for transcoding. This allows an especially simple and cost-effective implementation in the transcoding of the transform coefficient data to be achieved.

If the encoded digital video input signal is decoded before the transcoding by an entropy decoder and the encoded digital video output signal is encoded by an entropy encoder, a data volume for the encoded digital video input signal and the encoded digital video output signal can be significantly reduced.

Preferably the third piece of page data and the third piece of transform coefficient data of the encoded digital video output signal are encoded in accordance with a first video encoding standard and the first and second piece of page data and the first and second piece of transformation coefficient data are based on a second video encoding standard. The result of using the first or second video encoding standard is that individual syntax elements of the different pieces of page data can be encoded with available modules of the first or second video encoding standard in a simple and cost-effective manner.

As an example, a method according to a standard, especially H.261, H.263, H.264, MPEG1, MPEG2 or MPEG4, is used as the first and/or second video encoding standard, so that existing modules of a first or second video encoding standard can be used again for transcoding. A cost-effective implementation can thus be guaranteed.

Preferably a first part of syntax elements of the respective third piece of page data is taken from the respective second piece of page data, and a second part of syntax elements of the respective third piece of page data is generated from a combination of the first and the respective second pieces of page data. Both the re-use of syntax elements and also combination of syntax elements make it possible to create new syntax elements of the third piece of page data with little processing effort.

In an expansion it is advantageous to obtain at least one syntax element SY3, SY4, SY5 of the first part T1 identical to the first and second pieces of page data SB, SE1, SE2 from the first page data SB. This simplifies the creation of the third piece of page data, since the syntax elements identical for all third pieces of page data must only be extracted once from the first piece of page data of the base signal.

Preferably the encoded digital video output signal is created such that this signal is formed by the base signal and optional inclusion of at least one differential extension signal and in this case a predeterminable data rate is not exceeded. This makes it possible to achieve an optimized image quality of the encoded digital video output signal depending on the predeterminable data rate.

Also described below is a transcoding device for transcoding an encoded digital video input signal with a base signal and at least one differential extension signal, with a decoder unit for determining a first piece of page data and a first piece of transform coefficient data from the base signal and a second piece of page data and a second piece of transform coefficient data from at least one differential extension signal, with a page encoding unit for generating a third piece of page data from the first and at least one second piece of page data, with a transform coefficient encoding unit for generating a third piece of transform coefficient data through weighted addition from the first and at least one second piece of transform coefficient data, with the first, second and third pieces of transform coefficient data being based on an identical transform coefficient encoding method, and with an encoder unit for creating an encoded digital video output signal from the third piece of page data and the third piece of transform coefficient data. The transcoding device advantageously makes it possible to implement the method described below.

If the transcoding device is additionally equipped with an entropy decoder for decoding the encoded digital video input signal before transcoding and with an entropy encoder for encoding the encoded digital video output signal, the volume of data needed for the encoded digital video input signal and the encoded digital video output signal is reduced.

If the transcoding device is additionally integrated into a terminal and/or into a network element, the method can be executed both in a terminal, such as a digital computer for example, and also in a network element, such as an application server in a GPRS (GPRS—General Packet Radio System) network.

BRIEF DESCRIPTION OF THE DRAWINGS

These and other objects and advantages will become more apparent and more readily appreciated from the following description of the preferred embodiments, taken in conjunction with the accompanying drawings of which:

FIG. 4 is a data structure diagram of various syntax elements of the base signal and of the two differential extension signals as well as two possible video output signals.

DETAILED DESCRIPTION OF THE PREFERRED EMBODIMENT

Reference will now be made in detail to the preferred embodiments, examples of which are illustrated in the accompanying drawings, wherein like reference symbols refer to like elements throughout.

Figure 1:
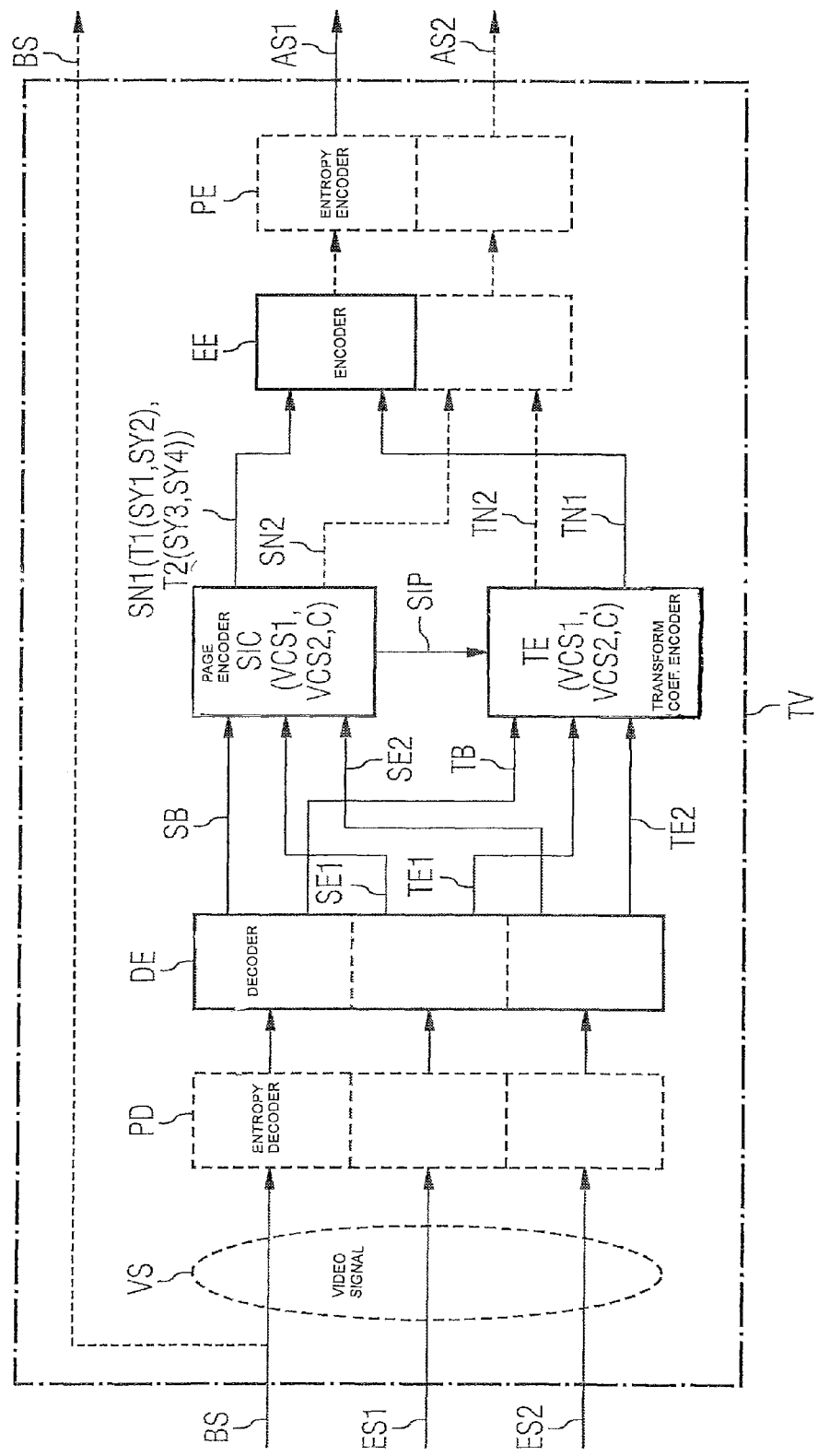
FIG. 1 is a block diagram of a transcoding device for executing the method.

FIG. 1 depicts an exemplary embodiment for a transcoding device TV which is used for executing the method. The encoded digital video input signal VS which is to be transcoded includes a base signal BS and at least one differential extension signal ES1, ES2. The base signal BS, which is an encoded digital video signal, can be decoded independently of a differential extension signal ES1, ES2. The base signal BS typically corresponds to the lowest quality level of a video sequence, i.e. to a base quality. The base signal BS includes a first piece of page data SB and a first piece of transform coefficient data TB.

Each of the differential extension signals ES1, ES2 includes a second piece of page data SE1, SE2 and a second piece of transform coefficient data TE1, TE2 respectively. The differential extension signals ES1, ES2 contain incremental image data, which together with the base signal BS improves the image quality of the video sequence. To decode a differential extension signal, such as the second differential extension signal ES2 for example, both the base signal BS and also the lower differential extension signal, such as the first differential extension signal ES1 must in fact be decoded. With the aid of the first differential extension signal ES1 a first additional quality level and with the aid of the first and second differential extension signal ES1 ES2, a second, improved quality level compared to the basic quality is obtained. The second piece of transform coefficient data TE1 of the first differential extension signal ES1 merely includes a piece of differential data which is formed from the subtraction of the respective transform coefficients of the first quality level and the relevant transform coefficients of the basic quality level. The second piece of transform coefficient data TE2 is created by subtraction of the respective transform coefficients of the quality level belonging to the second piece of transform coefficient data TE2 and of the comparatively lower quality levels. A weighting of the transform coefficient to be subtracted can also be undertaken. Details are known from citations in the Background section.

In a next alternative operation the base signal BS and the two differential extension signals ES1, ES2 are initially processed by an entropy decoder PD. A Hufmann encoding scheme is known for example under entropy encoding or decoding for example, in which in general codewords which occur frequently are each assigned a short initial codeword and codewords which occur less frequently are each assigned a longer initial codeword. In the exemplary embodiment depicted in FIG. 1 the base signal BS and each of the differential extension signals ES1, ES2 is decoded with the aid of the entropy decoder PD.

In a further operation the base signal BS and the two differential extension signals ES1, ES2 or the corresponding signals are forwarded to a decoder unit DE after the alternative entropy decoding. The function of the decoder unit DE is to determine the first and second pieces of page data SB, SE1, SE2 and the first and second pieces of transformation coefficient data TB, TE1, TE2 of the base signal BS and of the differential extension signals ES1, ES2. For example the second piece of page data SE2 and the second piece of transform coefficient data TE2 are reproduced for the second differential extension signal ES2.

Subsequently, using a page encoding unit SIC, at least one piece of third page data SN1, SN2 is formed with the aid of the first piece of page data SB of the base signal BS and of the second piece of page data SE1, SE2 respectively of at least one of the differential extension signals ES1, ES2. A useful embodiment variant for generating at least one third piece of page data SN1, SN2 is explained in greater detail below with the aid of FIG. 4. In this case the third piece of page data SN1 is generated from the first piece of page data SB and the second piece of page data SE1 of the first differential extension signal ES1.

FIG. 4 shows in the upper part of the figure first and second pieces of transform coefficient data TB, TE1, TE2 and first and second pieces of page data SB, SE1, SE2. As can be seen from the example of the base signal BS of FIG. 4, the first piece of page data SB contains a number of syntax elements, such as the syntax elements SY3, . . . , SY7 for example. The second piece of page data SE1 of the first differential extension signal ES1 includes for example the syntax elements SY1, SY3, SY4, SY5, SY2*. To create the third page piece of data SN1 for the encoded digital video output signal AS1, those syntax elements of the second page data SE1 which can be accepted unchanged are first copied into the third piece of page data SN1. These are combined in FIG. 4 in a first subset T1. In the present exemplary embodiment the syntax elements SY1, SY3, SY4, SY5 of the first part T1 describe the following functions for example:

First syntax element SY1: The first syntax element SY1 includes a first quantizing parameter.

Third syntax element SY3: The third syntax element SY3 describes, in the form of a header field ("main header"), general information, such as an image size of the encoded digital video input signal VS for example.

Fourth syntax element SY4: The fourth syntax element SY4 includes motion estimation information, such as the motion vectors for example.

Fifth syntax element SY5: The fifth syntax element SY5 describes additional information which is identical for the base signal BS and all differential extension signals ES1, ES2, such as a prediction mode of the motion estimation for example.

Furthermore the third piece of page data SN1 includes at least one further syntax element SY2, which is generated from a combination of the first piece of page data SB and the second piece of page data SE1. This type of syntax elements SY2 can be combined in a second part T2. In the present exemplary embodiment according to FIG. 4 the second syntax element SY2 is formed from the seventh syntax element SY7 and the modified second syntax element SY2*. For example a specification is given in standard H.264 of a Coded Block Pattern (CBP) for a macroblock of 16×16 pixels, as to which of the four possible 8×8 blocks is encoded. The coded block pattern of 4 bits, with a logical one "1" indicating the presence of a specific encoded 8×8 block and a logical zero "0" expressing for a specific 8×8 block that this block is not encoded. Thus for example coded block pattern "1000" means that the 8×8 block is encoded at the top left in the 16×16 macroblock and the other three 8×8 blocks are unencoded. Thus the seventh and the second modified syntax element SY7, SY2* can each correspond to a specific coded block pattern and for example assume the following values:

SY7="1000" (only the top left 8×8 block is encoded)

SY2*="0001" (only the bottom right 8×8 block is encoded)

A new coded block pattern, corresponding to the second syntax element SY2 can be created from a bit-wise logical OR combination of the seventh and the second modified syntax element SY7, SY2* below and is as follows:

SY2="1001" (the 8×8 block at the top left and bottom right is encoded)

Thus the macroblock belonging to the coded block pattern SY2, in accordance with citations in the Background section and H.264 will have an encoding both for the top left 8×8 block and also for the bottom right 8×8 block, whereas the two other 8×8 blocks are unencoded.

As can be seen in FIG. 4 one or more syntax elements, such as the third syntax element SY3 (main header) for example, can be used both in the first piece of page data SB of the base signal BS and also in the respective second piece of page data SE1, SE2 of the differential extension signal ES1, ES2. It is thus possible in a useful expansion of the method, to obtain one or more syntax elements of the first part T1 in the generation of a third piece of page data SN1, SN2 directly from the first piece of page data SB. Thus in accordance with FIG. 4 the third, fourth and fifth syntax element SY3, SY4, SY5 are identical both in the base signal BS and also in the differential extension signals ES1, ES2. In an alternative embodiment the respective second pieces of page data SE1, SE2 can merely include those syntax elements which are not identical with one of the syntax elements of the first piece of page data SB of the base signal BS. Thus the method can also be employed if for example the second piece of page data SE1 merely includes the first and the modified second syntax element SY1, SY2*.

The procedure for creating the further third piece of page data SN2 is in accordance with the embodiment for creating the third piece of page data SN1, with however, instead of the one piece of second page data SE1, the other piece of second page data SE2 now having to be taken into account.

According to the method the syntax elements of the first and second piece of page data SB, SE1, SE2 can be encoded in accordance with a first video encoding standard VCS1 and the syntax elements of the third piece of page data SN1, SN2 can be encoded in accordance with a second video encoding standard VCS2. Thus the syntax elements can be encoded in accordance with at least one of the standards H.261, H.263, H.264, MPEG-1 Visual, MPEG-2 Visual/H262 or MPEG-4 Visual. An implementation for creating the third piece of page data SN1, SN2 which is simple in practice is produced if the first and second video encoding standards VCS1, VCS2 are identical. In this case the respective third piece of page data SN1, SN2 is possibly formed merely through copying individual syntax elements of the first and second piece of page data SB, SE1, SE2. If however the first and second video encoding standard VCS1, VCS2 are different, for creating the syntax elements of the respective third piece of page data SN1, SN2, one or more syntax elements of the first and second pieces of page data SB, SE1, SE2 must be converted under some circumstances from the first video encoding standard VCS1 into the second video encoding standard VCS2.

Figure 3:
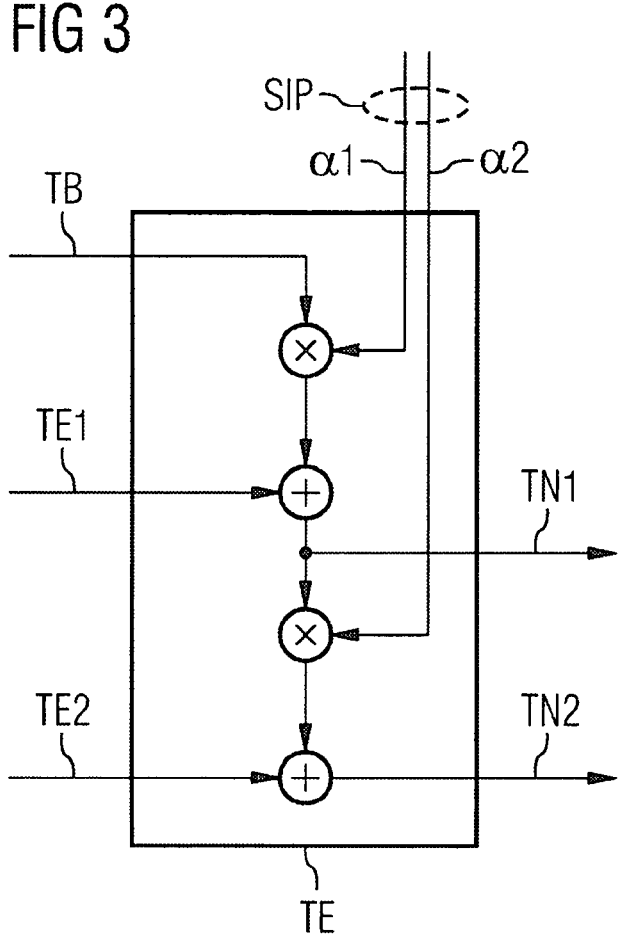
FIG. 3 is a signal flow diagram for logical linkage of the different transformation coefficient data for generation of pieces of third transformation coefficient data, taking into account page data parameters.

Next, using the first and second pieces of transform coefficient data TB, TE1, TE2, at least one third piece of transform coefficient data TN1, TN2 is formed with the aid of a transform coefficient encoder unit TE. This transform coefficient encoder unit TE generates the third pieces of transform coefficient data TN1, TN2 in accordance with a method known from cited in the Background section. In this way the third piece of transform coefficient data TN1, TN2 is created by a weighted addition. A possible realization variant for generation of the third piece of transform coefficient data TN is explained in greater detail below with reference to FIG. 3. In this case the method known from citation cited in the Background section, file reference of German patent application DE 101 46 220.4, is executed. The new piece of transform coefficient data TN is formed using coefficients from a linear combination of the first piece of transform coefficient data TB of the base signal BS and the second piece of transform coefficient data TE1 of the first differential extension signal ES1. This can be expressed by the following equation:

$$TN1 = TB \cdot \alpha 1 + TE1$$

In this case a first weighting coefficient reflects a weighting for the first transform coefficient data TB. For example in accordance with citation cited in the Background section, file reference of German patent application DE 101 46 220.4, the first weighting parameter α1 is obtained from the division of a base quantizing parameter QP0 of the base signal BS and of a first quantizing parameters QP1 of the first differential extension signal ES1. This can be expressed by the following equation:

$$\alpha 1 = \frac{QP0}{QP1}$$

In accordance with the exemplary embodiment depicted in FIG. 4 the base quantizing parameter QP0 of the base signal BS corresponds to the sixth syntax element SY6 and the first quantizing parameter QP1 of the first differential extension signal ES1 to the first syntax element SY1.

Further third pieces of transform coefficient data TN2 are formed in a similar manner. For example the next third piece of transform coefficient data TN2 is described by the following equation:

$$TN2 = TE2 + \alpha 2 \cdot (TE1 + \alpha 1 \cdot TB)$$

In this case a second weighting parameter α2 is determined by division of a second quantizing parameter QP2 of the second differential extension signal ES2 and of the first quantizing parameter QP1 of the first differential extension signal ES1. The first and second weighting parameter α1, α2 are transferred with the aid of a page data parameter SIP, which is generated for example by a page encoding unit SEC, to the transform coefficient encoder unit TE.

In a subsequent operation the third piece of transform coefficient data TN1, TN2 is transferred with the relevant third piece of page data SN1, SN2 from the transform coefficient encoder unit TE and the page encoder unit SIC to an encoder unit EE for creating the encoded digital video output signal AS1, AS2. The lower half of the diagram in FIG. 4 shows two encoded digital video output signals AS1, AS2. Each of these encoded digital video output signals AS1 or AS2 includes the third piece of page data SN1 or SN2 and the third piece of transform coefficient data TN1 or TN2. In practice it is especially useful for the encoder unit EE to create the encoded digital video output signals AS1, AS2 in such a way that these are able to be decoded with the aid of a video encoding standard, such as a first or second video encoding standard VCS1 or VCS2 for example.

In a possible expansion of the method the encoded digital video output signals AS1, AS2 are encoded with the aid of an entropy encoder PE. In this case the entropy encoder PE employs a Hufmann encoding method for example.

After the transcoding of the encoded digital video input signal VS with a base signal BS and at least one differential extension signal ES1, ES2 by the transcoding device TV, at least one encoded digital video output signal AS1, AS2 is available at the output of the transcoding device TV. This means that at least one of the encoded digital video output signals AS1, AS2, as well as the base signal BS can be made available to a user. The base signal BS has a low image quality, the encoded digital video output signal AS1 an improved image quality and the highest encoded digital video output signal AS2 the highest image quality.

The selection of whether one of the encoded digital video output signals AS1, AS2 or the base signal BS, which is also an encoded digital video signal, is output through the transcoding device TV, is controlled such that, as a result of the predeterminable data rate C, those video signals or video output signals BS, AS1, AS2 are output which do not exceed the predeterminable data rate C and deliver the best image quality under such circumstances. The following example illustrates this:

| Base signal BS: | | |
| --- | --- | --- |
| Image quality low Encoded digital video output signal VS1: | Data rate: | 64 Kbit/s |
| Image quality medium Encoded digital video output signal VS2 | Data rate: | 96 Kbit/s |
| Image quality high Predeterminable | Data rate: data rate C: | 128 Kbit/s 100 Kbit/s |

In this example the encoded digital video output signal VS1 is selected, since it does not exceed the predeterminable data rate C=100 Kbit/s and thus delivers the best image quality. Although the base signal BS also does not exceed the predeterminable data rate C it does however produce an inferior image quality to the encoded digital video output signal VS1.

Figure 2A:
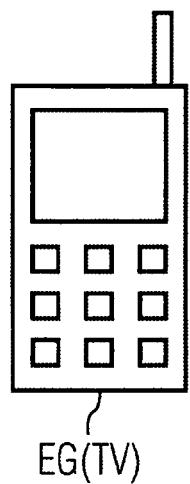
FIGS. 2a and 2b are block diagrams of two exemplary embodiments, each including a transcoding device for transcoding.

In accordance with FIG. 2A the transcoding device TV can be integrated into a terminal EG, such as a mobile radio communication device, in accordance with the GSM standard or UMTS standard for example, and also into a processing unit, which is connected to a public Internet and/or Intranet. In this case the transcoding device TV is used for example to provide an encoded digital video output signal AS1, AS2 with a predeterminable data rate C from an encoded digital video input signal VS with a base signal BS and at least one differential extension signal ES1, ES2. This is decoded by a downstream video decoder and displayed with the aid of a display in the terminal EG. Thus the transcoding device TV allows an encoded digital video input signal VS, which has a number of part signals and that is encoded for example according to a video encoding standard, and that is not able to be decoded for the video decoder of the terminal EG, to be transcoded in such a way that decoding is made possible in the terminal EG.

Figure 2B:
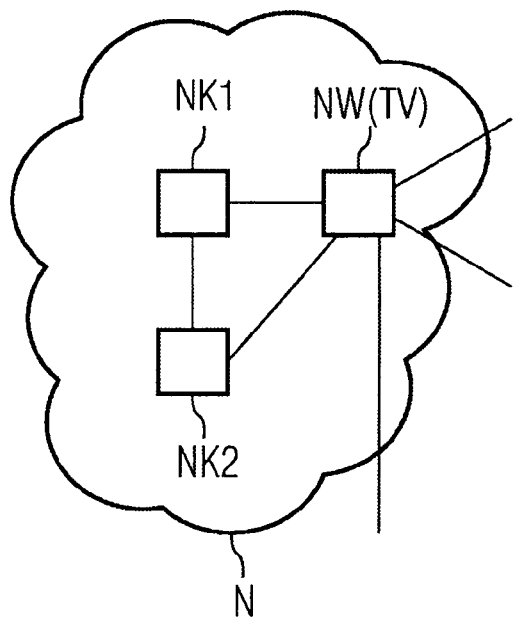

In a second application scenario according to FIG. 2B the transcoding device TV is integrated into a network element NW. In this case the network element NW has the task for example, depending on the transmission bandwidth available, of generating an encoded digital video output signal AS1, AS2 in such a manner that the signal is able to be transmitted in the network system N taking into account the data rate available. If the available data rate of the transmission path changes, the transcoding device TV accordingly adapts itself to the data rate of the encoded digital video output signal AS1, AS2, by adding or removing one or more differential extension signals ES1, ES2. For example the network element NW is integrated into a packet-oriented network system N according to the GSM standard, UMTS standard or SIP standard. For example the network element NW is also part of a network system in accordance with the ISDN or ATM standard, which for example includes yet further network units NK1, NK2.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for transcoding an encoded digital video input signal having a base signal and at least one differential extension signal, comprising:
   determining a first piece of page data and a first piece of transform coefficient data from the base signal;
   determining at least one second piece of page data and at least one second piece of transform coefficient data respectively from at least one differential extension signal;
   generating a third piece of page data from the first piece of page data and from the at least one second piece of page data;
   generating a third piece of transform coefficient data from the first piece of transform coefficient data and from at least one second piece of transform coefficient data, the first, second and third pieces of transform coefficient data being based on an identical transform coefficient encoding method; and
   creating an encoded digital video output signal from the third piece of page data and the third piece of transform coefficient data,
   wherein a first part of syntax elements of the third piece of page data is taken from syntax elements of the second piece of page data, and a second part of syntax elements of the third piece of page data is generated from a combination of syntax elements of the first and the second pieces of page data.

2. The method as claimed in claim 1, wherein the encoded digital video input signal is encoded before the transcoding by an entropy decoder and the encoded digital video output signal is encoded by an entropy encoder.

3. The method as claimed in claim 2, wherein the third piece of page data and the third piece of transform coefficient data of the encoded digital video output signal are encoded in accordance with a first video encoding standard and the first and second piece of page data and the first and second piece of transform coefficient data are based on a second video encoding standard.

4. The method as claimed in claim 3, wherein at least one of the first and second video encoding standard is H.261, H.263, H.264, MPEG1, MPEG2 or MPEG4.

5. The method as claimed in claim 1, wherein the third piece of transform coefficient data is generated by weighted addition from the first and at least one second piece of transform coefficient data.

6. The method as claimed in claim 1, wherein at least one syntax element of the first part identical to the first and second piece of page data is taken from the first piece of page data.

7. The method as claimed in claim 3, wherein said creating of the encoded digital video output signal is formed by the base signal and by optional inclusion of at least one differential extension signal without exceeding a predeterminable data rate.

8. The method as claimed in claim 1, wherein the third piece of page data and the third piece of transform coefficient data of the encoded digital video output signal are encoded in accordance with a first video encoding standard and the first and second piece of page data and the first and second piece of transform coefficient data are based on a second video encoding standard.

9. The method as claimed in claim 8, wherein at least one of the first and second video encoding standard is H.261, H.263, H.264, MPEG1, MPEG2 or MPEG4.

10. The method as claimed in claim 8, wherein said creating of the encoded digital video output signal is formed by the base signal and by optional inclusion of at least one differential extension signal without exceeding a predeterminable data rate.

11. A transcoding device for transcoding an encoded digital video input signal with a base signal and at least one differential extension signal, comprising:
    a decoder configured to determine a first piece of page data and a first piece of transform coefficient data from the base signal and a second piece of page data and a second piece of transform coefficient data from the at least one differential extension signal;
    a page encoder configured to generate a third piece of page data from the first piece of page data and from at least one second piece of page data;
    a transform coefficient encoder configured to generate a third piece of transform coefficient data from the first piece of transform coefficient data and at least one second piece of transform coefficient data, where the first, second and third pieces of transform coefficient data are based on an identical transform coefficient encoding method; and
    an encoder configured to create an encoded digital video output signal from the third piece of page data and the third piece of transform coefficient data,
    wherein a first part of syntax elements of the third piece of page data is taken from syntax elements of the second piece of page data, and a second part of syntax elements of the third piece of page data is generated from a combination of syntax elements of the first and the second pieces of page data.

12. A transcoding device as claimed in claim 11, further comprising:
    an entropy decoder configured to decode the encoded digital video input signal before transcoding, and
    an entropy encoder configured to encode the encoded digital video output signal.

13. A transcoding device as claimed in claim 12, wherein said transcoding device is integrated into one of a terminal and a network element.

14. A transcoding device as claimed in claim 11, wherein said transcoding device is integrated into one of a terminal and a network element.

15. The method as claimed in claim 8, wherein at least one syntax element of the first part identical to the first and second piece of page data is taken from the first piece of page data.

16. The method as claimed in claim 15, wherein said created encoded digital video output signal is formed by the base signal and by optional inclusion of at least one differential extension signal without exceeding a predeterminable data rate.

17. The method as claimed in claim 1, wherein said created encoded digital video output signal is formed by the base signal and by optional inclusion of at least one differential extension signal without exceeding a predeterminable data rate.

18. The method as claimed in claim 2, wherein at least one syntax element of the first part identical to the first and second piece of page data is taken from the first piece of page data.

19. The transcoding device as claimed in 11, wherein at least one syntax element of the first part identical to the first and second piece of page data is taken from the first piece of page data.

20. The transcoding device according to claim 11, wherein the third piece of transform coefficient data is generated by weighted addition from the first and at least one second piece of transform coefficient data.

21. The transcoding device according to claim 11, wherein said created encoded digital video output signal is formed by the base signal and by optional inclusion of at least one differential extension signal without exceeding a predeterminable data rate.

* * * * *